(12) United States Patent
Bowen

(10) Patent No.: US 10,696,361 B2
(45) Date of Patent: Jun. 30, 2020

(54) PERSONAL RIDING BOARD FOR AQUATIC SPORTING ACTIVITIES

(71) Applicant: Stuart Nicholas Bowen, Yamba (AU)

(72) Inventor: Stuart Nicholas Bowen, Yamba (AU)

(*) Notice: Subject to any disclaimer, the term of this patent is extended or adjusted under 35 U.S.C. 154(b) by 0 days.

(21) Appl. No.: 16/191,443

(22) Filed: Nov. 15, 2018

(65) Prior Publication Data

US 2019/0144084 A1 May 16, 2019

(30) Foreign Application Priority Data

Nov. 15, 2017 (AU) ................. 2017904636

(51) Int. Cl.
| | | |
|---|---|---|
| *B63B 32/57* | (2020.01) | |
| *B32B 5/18* | (2006.01) | |
| *B32B 5/22* | (2006.01) | |
| *B32B 5/24* | (2006.01) | |
| *B32B 27/12* | (2006.01) | |
| *B32B 27/30* | (2006.01) | |
| *B32B 27/36* | (2006.01) | |
| *B32B 27/38* | (2006.01) | |
| *B32B 7/02* | (2019.01) | |
| *B32B 5/02* | (2006.01) | |

(52) U.S. Cl.
CPC .............. *B63B 32/57* (2020.02); *B32B 5/022* (2013.01); *B32B 5/18* (2013.01); *B32B 5/245* (2013.01); *B32B 7/02* (2013.01); *B32B 27/12* (2013.01); *B32B 27/30* (2013.01); *B32B 27/36* (2013.01); *B32B 27/38* (2013.01); *B32B 2262/101* (2013.01); *B32B 2266/025* (2013.01); *B32B 2266/0235* (2013.01); *B32B 2266/0278* (2013.01); *B32B 2307/546* (2013.01); *B32B 2605/00* (2013.01)

(58) Field of Classification Search
CPC ......... B63B 35/00; B63B 35/79; B63B 35/81; B63B 35/7906; B63B 35/7909; B63B 35/73; B63B 35/85; B32B 5/00; B32B 5/18; B32B 5/24; B32B 5/245; B32B 27/00; B32B 27/12; B32B 27/30; B32B 27/36; B32B 27/38; B32B 7/00; B32B 7/02
USPC ...................... 114/357; 441/65, 74
See application file for complete search history.

(56) References Cited

U.S. PATENT DOCUMENTS

| | | | |
|---|---|---|---|
| 7,892,058 B1* | 2/2011 | Echecopar | B63B 35/7906 441/74 |
| 8,696,397 B2 | 4/2014 | MacDonald | |
| 9,216,801 B2 | 12/2015 | Barron | |
| 2008/0210137 A1* | 9/2008 | Cox | B63B 35/7906 108/51.3 |
| 2011/0223821 A1* | 9/2011 | Chi | B63B 35/7909 441/74 |
| 2012/0322325 A1* | 12/2012 | Filen | B63B 35/7906 441/74 |

\* cited by examiner

*Primary Examiner* — Lars A Olson
(74) *Attorney, Agent, or Firm* — Martin IP Pty Ltd

(57) ABSTRACT

A personal riding board for aquatic sporting activities. The board includes multiple layers. At least two of the layers include a reinforcement member. The reinforcement members function together similar to a leaf spring to provide the board enhanced flexibility where needed while minimising the risk of breakage.

20 Claims, 3 Drawing Sheets

PERSONAL RIDING BOARD FOR AQUATIC SPORTING ACTIVITIES

FIELD OF THE INVENTION

The present disclosure relates to a personal riding board for sporting activities.

BACKGROUND OF THE INVENTION

Conventional surf boards include a flotation core and a vertically aligned wooden stringer from end to end. The vertically aligned wooden stringer is required to provide relative stiffness to the flotation core, which is typically fragile. The flotation core and wooden stringer are enveloped in a fiberglass-lamination skin. The fiberglass-lamination skin is a waterproof composite that insofar as possible excludes water from the flotation core. Such surf boards are subject to breakage under normal use and, when broken, create a substantial environmental footprint when discarded. Accordingly, a need exists for a personal riding board for aquatic sporting activities that can withstand forces experienced during reasonable use.

SUMMARY

The following is a broad summary of various exemplary embodiments of a personal riding board for aquatic sporting activities.

According to an embodiment, there is provided a personal riding board for aquatic sporting activities, including: a housing having a nose portion, a tail portion opposite the nose portion along a longitudinal axis, a top surface configured for placement of a user's feet and/or body, and a bottom surface opposite the top surface; an upper core layer oriented proximate the top surface; a lower core layer oriented proximate the bottom surface; and a composite spring structure configured to bias the nose portion and tail portion upwardly, the composite spring structure including a first longitudinal reinforcement member oriented along the longitudinal axis, and a second longitudinal reinforcement member oriented along the longitudinal axis, the first longitudinal reinforcement member and the second longitudinal reinforcement member overlying one another in a vertical longitudinal plane.

In another embodiment, the first longitudinal reinforcement member is in the upper core layer, and the second reinforcement member is in the lower core layer.

In another embodiment, the first longitudinal reinforcement member has a length less than that of the second longitudinal reinforcement member.

In another embodiment, the core layers are graduated in thickness from the lower core layer to the upper core layer.

In another embodiment, the composite spring structure functions as a leaf spring.

In another embodiment, each longitudinal reinforcement member has a width greater than a height.

In another embodiment, each longitudinal reinforcement member resides entirely within its respective core layer.

In another embodiment, the board omits any stringer.

In another embodiment, the board is sized and shaped for use as at least one of the following: a surfboard, a kite surfing board, a foil board, a paddle board (prone), a paddle board (stand up), a wake board, and a sail board.

In another embodiment, at least two of the core layers are laminated.

In another embodiment, the board further includes a central core layer oriented between the upper core layer and the lower core layer.

In another embodiment, the board further includes a third longitudinal reinforcement member.

In another embodiment, the third longitudinal reinforcement member has a length different than the lengths of the first reinforcement member and the second reinforcement member.

In another embodiment, the third longitudinal reinforcement member resides in the central core layer.

In another embodiment, the longitudinal reinforcement members are completely separated from one another.

In another embodiment, each longitudinal reinforcement member has the same width.

According to further embodiment, there is provided a personal riding board for aquatic sporting activities, including: a housing having a nose portion, a tail portion opposite the nose portion along a longitudinal axis, a top surface configured for placement of a user's feet and/or body, and a bottom surface opposite the top surface; an upper core layer oriented proximate the top surface; a lower core layer oriented proximate the bottom surface; a first reinforcement member oriented within the upper core layer; and a second reinforcement member oriented within the lower core layer, the first and second reinforcement members being configured to bias the nose portion and the tail portion upwardly towards each other.

In another embodiment, the board omits any stringer.

In another embodiment, the board is sized and shaped for use as at least one of the following: a surfboard, a kite surfing board, a foil board, a paddle board (prone), a paddle board (stand up), a wake board, and a sail board.

The reference to any prior art in this specification is not and should not be taken as an acknowledgement or any form of suggestion that the prior art forms part of the common general knowledge in Australia or in any other country.

The claims as filed and attached with this specification are hereby incorporated by reference into the text of the present description.

Embodiments of the board are now described, by way of example.

DETAILED DESCRIPTION OF THE DRAWINGS

Figure 1:
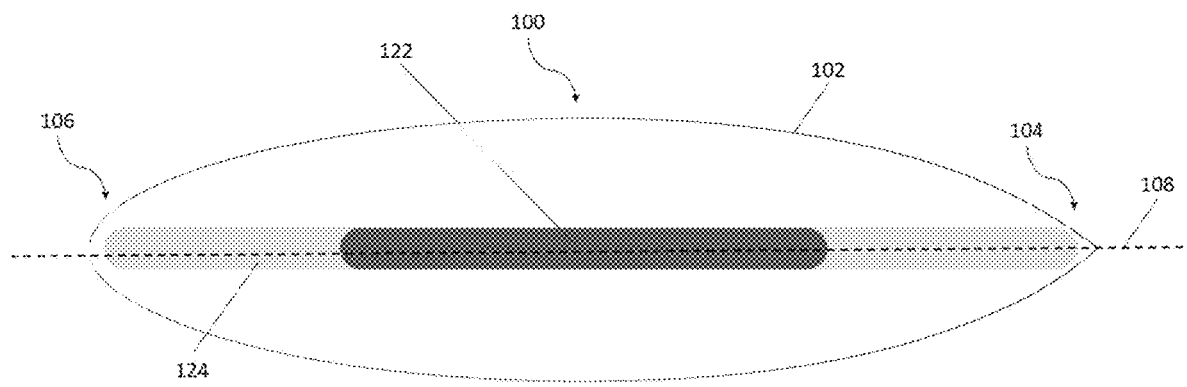
FIG. 1 is a top view of a personal riding board for aquatic sporting activities as herein described.
Figure 2:
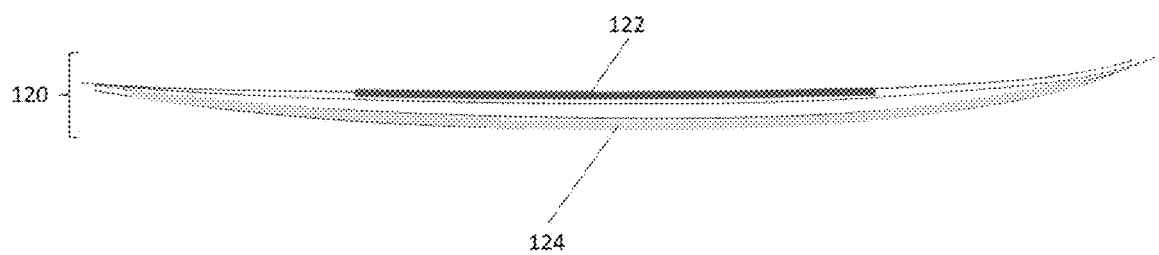
FIG. 2 is a cross-section of a composite spring structure of the board shown in FIG. 1.
Figure 3:
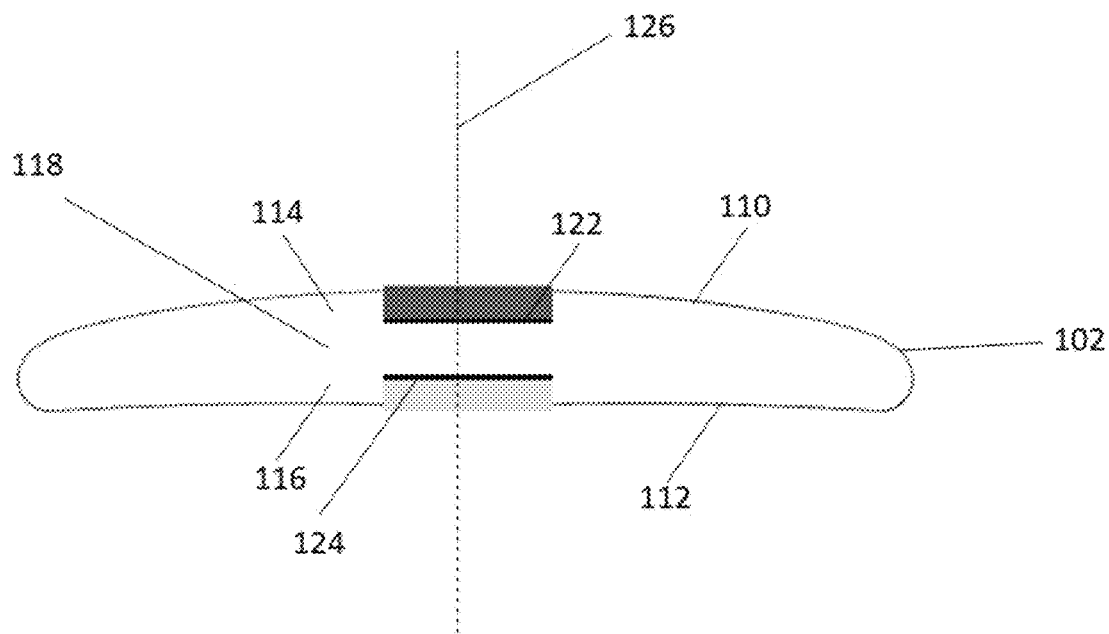
FIG. 3 is cross-section of the board of FIG. 1.

The following detailed description of embodiments of a personal riding board for aquatic sporting activities refers to the accompanying drawings. Alternative embodiments of the disclosure will be apparent to those of ordinary skill in the art from consideration of the specification. It is intended that the specification and examples be considered as exemplary only, with the true scope and spirit of the disclosure being indicated by the claims which follow. It will be understood that the term "comprising" is intended to have a broad, open meaning and not limited to a particular embodiment.

Wherever possible, like numbers will refer to like parts.

Referring to FIGS. 1 to 6, a personal riding board 100 for aquatic sporting activities includes a housing 102 having a nose portion 104 and a tail portion 106 opposite the nose portion 104 along a longitudinal axis 108. The board 100 has a top surface 110 configured for placement of a user's feet and/or body (not shown), and a bottom surface 112 opposite the top surface 110. An upper core layer 114 is oriented proximate the top surface 100 and a lower core layer 116 is oriented proximate the bottom surface 112. A composite spring structure 120 is configured to bias the nose portion 104 and tail portion 106 upwardly, for example, bending at least in part towards a vertical plan bisecting the length of board 100. The composite spring structure 120 includes a first longitudinal reinforcement member 122 and a second longitudinal reinforcement member 124 oriented along the longitudinal axis 108. The first longitudinal reinforcement member 122 and the second longitudinal reinforcement member 124 overlying one another in a vertical longitudinal plane 126. The first longitudinal reinforcement member 122 is located in the upper core layer 114, and the second reinforcement member 124 is located in the lower core layer 116. The first longitudinal reinforcement member 122 has a length less than that of the second longitudinal reinforcement member 124. The core layers 114, 118, 116 are graduated in thickness from the lower core layer 116 to the upper core layer 114.

Preferably, the composite spring structure 120 functions as a leaf spring. Also, preferably, each longitudinal reinforcement member 122, 124 has a width greater than a height.

Further preferably, each longitudinal reinforcement member 122, 124 resides entirely within its respective core layer 114, 116. In a preferred embodiment, the board 100 omits any stringer.

Preferably, the board 100 is sized and shaped for use as a surfboard. In a further preferred embodiment, the board 100 is sized and shaped for use as at least one of the following: a kite surfing board, a foil board, a paddle board (prone), a paddle board (stand up), a wake board, and a sail board.

Further preferably, at least two of the core layers are laminated.

Figure 4:
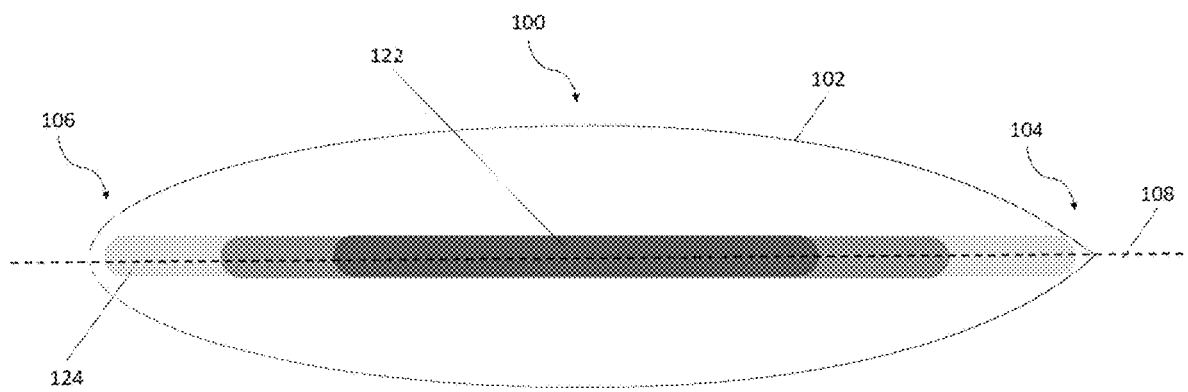
FIG. 4 shows another preferred personal riding board for aquatic sporting activities.
Figure 5:
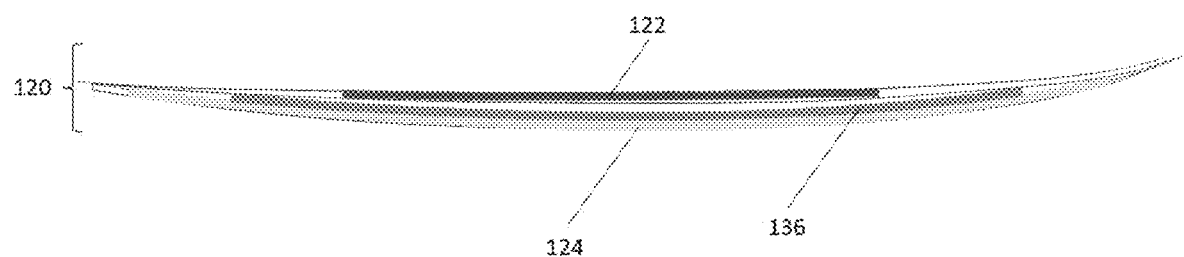
FIG. 5 is a cross-section of a composite spring structure of the board shown in FIG. 4.
Figure 6:
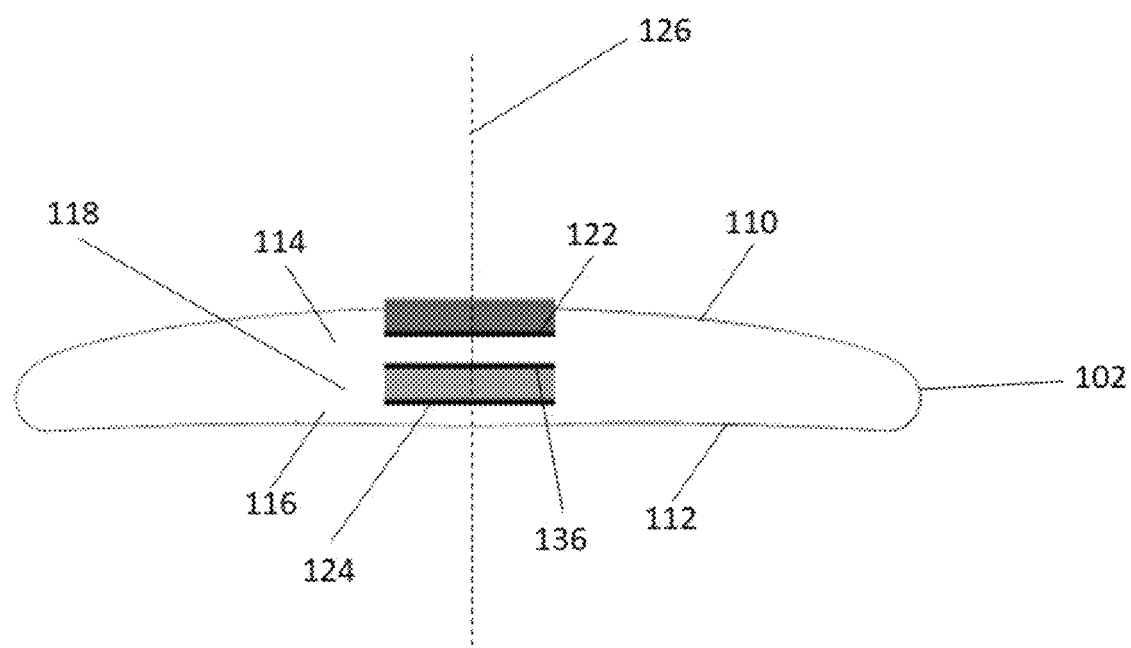
FIG. 6 is cross-section of the board of FIG. 4.

Specifically referring to FIGS. 4 to 6, the board 100 includes a central core layer 118 oriented between the upper core layer 114 and the lower core layer 116. Preferably, the board 100 includes a third longitudinal reinforcement member 136. The third longitudinal reinforcement member 136 has a length different than the lengths of the first reinforcement member 122 and the second reinforcement member 124, and the third longitudinal reinforcement member 136 resides in the central core layer 118.

In a further preferred embodiment, the longitudinal reinforcement members 122, 124, 136 are completely separated from one another. For example, the reinforcement members may have portions of the core layer separating them, such as foam. The reinforcement members are preferably constructed from a material stiffer relative to the material composing the core layer. For example, one or more reinforcement members may be constructed from carbon fibre, while the surrounding material is made of foam. If desired, the reinforcement members may be constructed from different materials for a single board to promote varying degrees of flexibility among the layers.

In a preferred embodiment, each longitudinal reinforcement member 122, 124, 136 may have the same width such as shown in FIG. 4.

A person skilled in the art will also appreciate that the board may be composed of a suitable foam material. Such foam material may be a polyurethane, polystyrene, polyvinyl chloride, or similar polymer foam. A person skilled in the art will appreciate that the foam material may be covered with one or more layer(s) of fibreglass, and the one or more layer(s) of fibreglass may in turn be covered with a suitable resin. The suitable resin may be an epoxy resin, a polyester resin, or polyvinyl resin.

A person skilled in the art will also appreciate that carbon fibre, Kevlar, and combinations of carbon fibre/Kevlar, and similar reinforcement materials may be used to manufacture the board.

A person skilled in the art will also appreciate that environmentally friendly resins may be used to manufacture the board. Such environmentally friendly resins may be organic resins. In a preferred embodiment, the core layers are composed of plant-derived material(s). Such plant-derived material may be derived from bamboo, hemp, kelp, soy, flax fibre, etc. The plant-derived material may include bio-based polymers and composites such as plant proteins, plant lipids, plant starches, or any combination of the afore-mentioned. The core layer may be composed of a basalt fibre if desired.

Preferred embodiments of the board may have a bottom surface that is shaped and configured to bottom-surface patterns known to a person skilled in the art. Such bottom-surface patterns may be belly, channel-hull, concave, flat, hydro hull, tri plane hull, V-shapes, or a combination of the afore-mentioned shapes.

Preferred embodiments of the tail portion of the board may be shaped and configured to tail patterns known to a person skilled in the art. Such tail patterns may be bat, diamond, fang, hip, pin, rounded, rounded diamond, rounded pin, rounded square, square, squash, star, swallow, swallow or fish, swallow tail with wings shaped, or any combination of the afore-mentioned tail patterns. The tail may be symmetrical or asymmetrical as desired.

A person skilled in the art will appreciate that board 100 will be able to withstand forces experienced during reasonable use thereby minimizing breakage and limiting the environmental impact of board 100 after use.

A person skilled in the art will appreciate that the board may be adapted for use in both aquatic and terrestrial environments. Terrestrial uses may include, for example, skiing, lugeing, skateboarding, sledding, snowboarding, street luge boarding, and wind boarding.

A method of manufacturing the board will now be described. Elongated floatation sheets which have an outline are each cut and then glued with various composite reinforcements and placed in a vacuum bag with appropriate rocker jig to set a bottom rocker shape or curvature.

Once the multi-layer lamination has cured, it will maintain the rocker shape and can be hand or machine shaped and laminated with fibre glass. The board shown can be manipulated to any desired curvature or rocker shape to enhance user/rider performance requirement characteristics.

Various composite materials can be utilised to control performance and sustainability characteristics. To reduce or prevent breakage, extra reinforcements can be added between layers. If desired the board may have ultra-light weight external lamination.

In one or more preferred embodiments, the board provides advantages of being more flexible, while minimizing or reducing risk of breakage. Particular configurations and arrangements of reinforcement members, such as described above, permit a rider to "feel" the energy associated with a wave (almost in a tactile sense), and enhances rider control.

It will of course be realised that the above has been given only by way of illustrative example of the invention and that all such modifications and variations thereto as would be apparent to persons skilled in the art are deemed to fall within the broad scope and ambit of the invention as herein set forth.

The features described with respect to one embodiment may be applied to other embodiments, or combined with, or interchanged with, the features of other embodiments without departing from the scope of the present invention.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A personal riding board for aquatic sporting activities, the board having a length, including:
    a housing having a nose portion, a tail portion opposite said nose portion along a longitudinal axis, a top surface configured for placement of a user's feet, and a bottom surface opposite said top surface;
    an upper core layer oriented proximate said top surface;
    a lower core layer oriented proximate said bottom surface; and
    a composite spring structure configured to bias and bend said nose portion and tail portion upwardly; and towards a vertical plane bisecting the length of the board, said composite spring structure including a first longitudinal reinforcement member oriented along the longitudinal axis, and a second longitudinal reinforcement member oriented along the longitudinal axis, said first longitudinal reinforcement member and said second longitudinal reinforcement member overlying one another in a vertical longitudinal plane.

2. The board of claim 1, wherein said first longitudinal reinforcement member is in said upper core layer, and said second reinforcement member is in said lower core layer.

3. The board of claim 1, wherein said first longitudinal reinforcement member has a length less than that of said second longitudinal reinforcement member.

4. The board of claim 1, wherein said core layers are graduated in thickness from said lower core layer to said upper core layer.

5. The board of claim 1, wherein said composite spring structure functions as a leaf spring.

6. The board of claim 1, wherein each longitudinal reinforcement member has a width greater than a height.

7. The board of claim 1, wherein each longitudinal reinforcement member resides entirely within its respective core layer.

8. The board of claim 1, wherein said board omits any stringer.

9. The board of claim 1, wherein said board is sized and shaped for use as a surfboard.

10. The board of claim 1, wherein said board is sized and shaped for use as at least one of the following: a kite surfing board, a foil board, a prone paddle board, a stand up paddle board, a wake board, and a sail board.

11. The board of claim 1, further comprising a central core layer oriented between said upper core layer and said lower core layer.

12. The board of claim 11, further including a third longitudinal reinforcement member.

13. The board of claim 12, wherein said third longitudinal reinforcement member has a length different than the lengths of said first reinforcement member and said second reinforcement member.

14. The board of claim 12, wherein said third longitudinal reinforcement member resides in said central core layer.

15. The board of claim 1, wherein at least two of said core layers are laminated.

16. The board of any one of the above claims, wherein said longitudinal reinforcement members are completely separated from one another.

17. The board of claim 1, wherein each longitudinal reinforcement member has the same width.

18. A personal riding board for aquatic sporting activities, the personal riding board having a length, including:
    a housing having a nose portion, a tail portion opposite said nose portion along a longitudinal axis, a top surface configured for placement of a user's feet, and a bottom surface opposite said top surface;
    an upper core layer oriented proximate said top surface;
    a lower core layer oriented proximate said bottom surface;
    a first reinforcement member oriented within said upper core layer; and
    a second reinforcement member oriented within said lower core layer, said first and second reinforcement members being configured to bias and bend said nose portion and said tail portion upwardly and towards a vertical plane bisecting the length of the board.

19. The board of claim 18, wherein said board omits any stringer.

20. The board of claim 18, wherein said board is sized and shaped for use as at least one of the following: a surf board, a kite surfing board, a foil board, a prone paddle board, a stand up paddle board, a wake board, and a sail board.

* * * * *